(12) United States Patent
Matsumoto et al.

(10) Patent No.: US 10,778,052 B2
(45) Date of Patent: Sep. 15, 2020

(54) SYNCHRONOUS RELUCTANCE TYPE ROTARY ELECTRIC MACHINE

(71) Applicants: Toshiba Industrial Products and Systems Corporation, Kawasaki-shi (JP); Toshiba Infrastructure Systems & Solutions Corporation, Kawasaki-shi (JP)

(72) Inventors: Masaaki Matsumoto, Mie (JP); Takashi Araki, Mie (JP); Makoto Matsushita, Fuchu (JP); Katsutoku Takeuchi, Kokubunji (JP); Toshio Hasebe, Hachioji (JP)

(73) Assignees: Toshiba Industrial Products and Systems Corporation, Kawasaki-shi (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 16/377,284

(22) Filed: Apr. 8, 2019

(65) Prior Publication Data

US 2019/0238013 A1    Aug. 1, 2019

Related U.S. Application Data

(63) Continuation of application No. PCT/JP2017/036831, filed on Oct. 11, 2017.

(30) Foreign Application Priority Data

Oct. 11, 2016   (JP) ................................ 2016-200159

(51) Int. Cl.
*H02K 1/24*  (2006.01)
*H02K 19/14* (2006.01)
(Continued)

(52) U.S. Cl.
CPC ............... *H02K 1/246* (2013.01); *H02K 1/22* (2013.01); *H02K 19/10* (2013.01); *H02K 19/103* (2013.01); *H02K 19/14* (2013.01)

(58) Field of Classification Search
CPC ........ H02K 1/246; H02K 1/276; H02K 15/12; H02K 15/022; H02K 1/22; H02K 19/103;
(Continued)

(56) References Cited

U.S. PATENT DOCUMENTS 5,903,080 A * 5/1999 Nashiki .................. H02K 1/246
310/162
6,849,983 B2 * 2/2005 Tajima .................. H02K 1/246
310/156.53
(Continued)

FOREIGN PATENT DOCUMENTS

CN    1420606 A    5/2003
CN    1533011 A    9/2004
(Continued)

OTHER PUBLICATIONS

International Search Report dated Jan. 16, 2018 in PCT/JP2017/036831, filed on Oct. 11, 2017 (with English translation).
(Continued)

*Primary Examiner* — Tran N Nguyen
*Assistant Examiner* — Leda T Pham
(74) *Attorney, Agent, or Firm* — Oblon, McClelland, Maier & Neustadt, L.L.P.

(57) ABSTRACT

A synchronous reluctance type rotary electric machine of an embodiment includes a shaft and a rotor core. The shaft rotates around a rotation axis. The rotor core is fixed to the shaft and includes multi-layered hollow parts having a convex shape toward a radially inward side formed for each pole in cross section. Then, when a center in a circumferential direction of one pole is a pole center, a hollow part
(Continued)

closest to the shaft among the plurality of hollow parts is a first hollow part, a hollow part positioned next to the first hollow part is a second hollow part, and a hollow part positioned on a side opposite to the first hollow part with respect to the second hollow part is a third hollow part, a width W1 between the first hollow part and the second hollow part on the pole center and a width W2 between the second hollow part and the third hollow part on the pole center are set to satisfy $W1 \leq W2$.

8 Claims, 9 Drawing Sheets

(51) Int. Cl.
  *H02K 19/10* (2006.01)
  *H02K 1/22* (2006.01)
(58) Field of Classification Search
  CPC .......... H02K 19/14; H02K 1/24; H02K 19/10; Y02T 10/7258; Y02T 10/641
  See application file for complete search history.

(56) References Cited

U.S. PATENT DOCUMENTS

| | | | | |
|---|---|---|---|---|
| 2015/0280498 | A1* | 10/2015 | Kolehmainen | H02K 1/246 310/216.107 |
| 2016/0294236 | A1 | 10/2016 | Alexander et al. | |
| 2016/0329787 | A1* | 11/2016 | Ito | H02K 1/246 |
| 2017/0110943 | A1* | 4/2017 | Tong | H02K 1/22 |

FOREIGN PATENT DOCUMENTS

| | | | |
|---|---|---|---|
| JP | 10-14185 | | 1/1998 |
| JP | 2001-186735 | | 7/2001 |
| JP | 2001-258222 | | 9/2001 |
| JP | 2002-101585 | | 4/2002 |
| JP | 2003009484 | A * | 1/2003 |
| JP | 2003-333813 | | 11/2003 |
| JP | 2004-056936 | | 2/2004 |
| JP | 2009-011118 | | 1/2009 |
| JP | 2009-77458 | A | 4/2009 |
| JP | 2011-147255 | | 7/2011 |
| JP | 2015-204664 | A | 11/2015 |
| JP | 2017-79530 | | 4/2017 |
| WO | WO 2015/132991 | A1 | 9/2015 |

OTHER PUBLICATIONS

Office Action dated Jul. 1, 2020, in corresponding Chinese Patent Application No. 201780062346.6 (with English translation), 19 pages.

* cited by examiner

SYNCHRONOUS RELUCTANCE TYPE ROTARY ELECTRIC MACHINE

CROSS-REFERENCE TO RELATED APPLICATIONS

This application is a continuation of International Application No. PCT/JP2017/036831, filed Oct. 11, 2017, which is based upon and claims the benefit of priority from Japanese Patent Application No. 2016-200159, filed on Oct. 11, 2016; the entire contents of which are incorporated herein by reference.

FIELD

Embodiments described herein relate generally to a synchronous reluctance type rotary electric machine.

BACKGROUND

A synchronous reluctance type rotary electric machine includes a rotor and a stator. The rotor includes a shaft rotatably supported and extending in an axial direction at a center of a rotation axis and a rotor core externally fitted and fixed to the shaft. The stator includes a stator core disposed on an outer circumference of the rotor core to be spaced apart from the rotor core and having a plurality of teeth disposed at intervals in a circumferential direction and multipole multiphase armature windings respectively wound around the plurality of teeth.

Multi-layered hollow parts having a convex shape toward a radially inward side are formed for each pole in the rotor core. When the hollow parts are formed in this manner, a direction in which magnetic flux easily flows and a direction in which magnetic flux does not easily flow are formed in the rotor core. Thus, the synchronous reluctance type rotary electric machine rotates the shaft using a reluctance torque generated by the hollow parts.

Here, in order to improve a rotational torque of the shaft, it is desirable to cause magnetic flux flowing through the rotor core to flow to the shaft side (a radial center side of the rotor core) as much as possible and distribute the magnetic flux uniformly over the entire rotor core. For this reason, for example, an interval between two hollow parts of the rotor core is set to be larger as the interval is closer to the shaft so that magnetic saturation does not occur at a portion close to the shaft in many cases.

In practice, however, magnetic flux flowing through the rotor core decreases in magnetic flux density as the magnetic flux moves closer to the shaft (closer to the radial center). Therefore, even when an interval between two hollow parts of the rotor core is set to be larger as the interval becomes closer to the shaft, there is a possibility that magnetic flux will not flow as expected.

Also, when hollow parts are formed in a rotor core, the rotor core tends to be deformed. Therefore, when the rotor core is rotated at a high-speed, there is a likelihood that the rotor core will be deformed due to a centrifugal force generated by the high-speed rotation.

DETAILED DESCRIPTION

A synchronous reluctance type rotary electric machine of an embodiment includes a shaft and a rotor core. The shaft rotates around a rotation axis. The rotor core is fixed to the shaft and includes multi-layered hollow parts having a convex shape toward a radially inward side formed for each pole in cross section. Then, when a center in a circumferential direction of one pole is a pole center, a hollow part closest to the shaft among the plurality of hollow parts is a first hollow part, a hollow part positioned next to the first hollow part is a second hollow part, and a hollow part positioned on a side opposite to the first hollow part with respect to the second hollow part is a third hollow part, a width W1 between the first hollow part and the second hollow part on the pole center and a width W2 between the second hollow part and the third hollow part on the pole center are set to satisfy $W1 \leq W2$.

Hereinafter, a synchronous reluctance type rotary electric machine of an embodiment will be described with reference to the drawings.

First Embodiment

Figure 1:
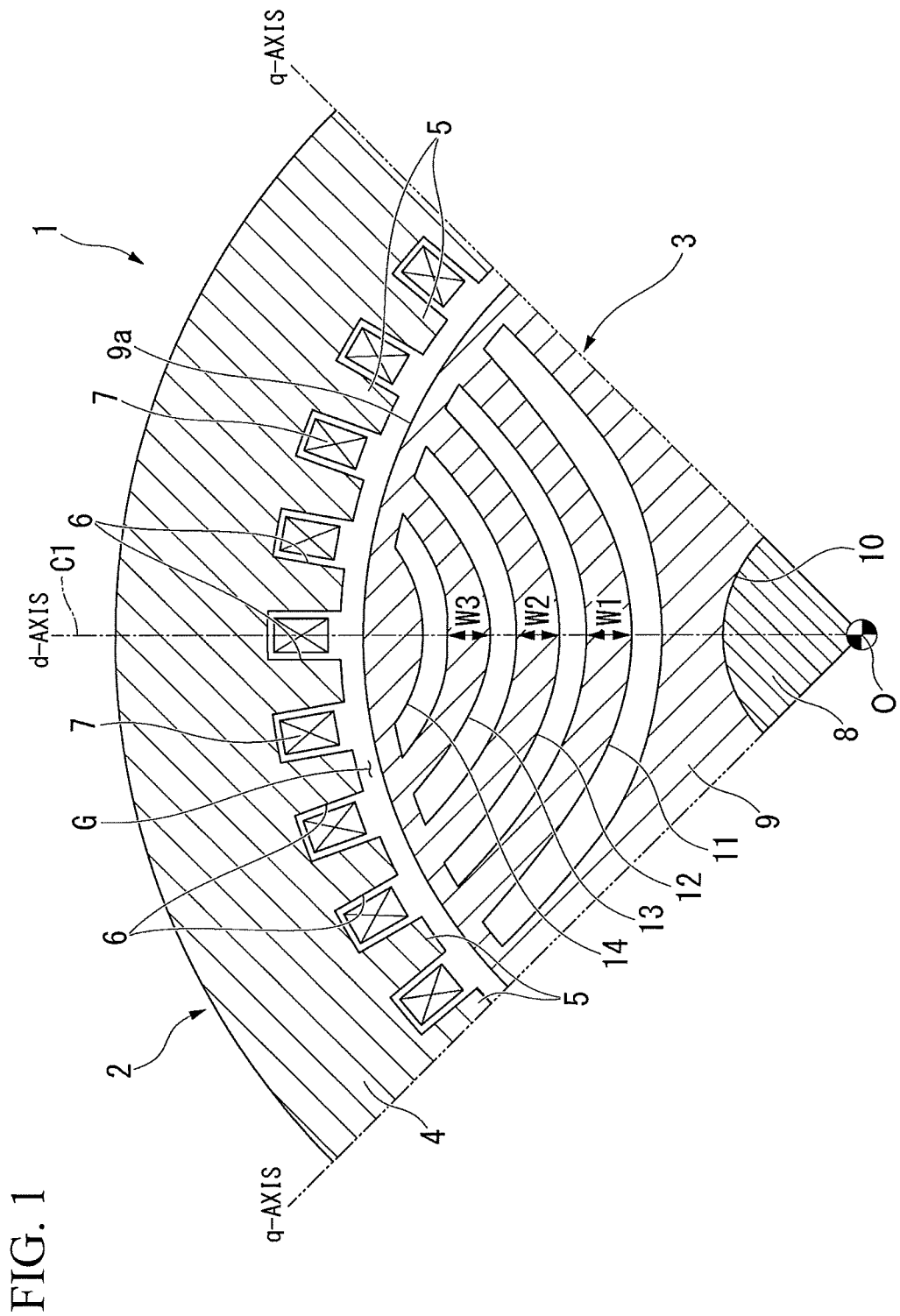
FIG. 1 is a cross-sectional view showing a configuration of a portion of a synchronous reluctance type rotary electric machine of a first embodiment.

FIG. 1 is a cross-sectional view perpendicular to a shaft 8 showing a configuration of a portion of a synchronous reluctance type rotary electric machine (hereinafter simply referred to as a rotary electric machine) 1. In FIG. 1, a quarter sector of the rotary electric machine 1, that is, only a quarter-circumference circumferential angular region is shown.

As shown in FIG. 1, the rotary electric machine 1 includes a substantially cylindrical stator 2 and a rotor 3 provided on a radially inward side from the stator 2 and provided to be rotatable with respect to the stator 2. Further, the stator 2 and the rotor 3 are disposed in a state in which central axes thereof are positioned on a common axis. Hereinafter, the common axis will be referred to as a central axis (rotation axis) O, a direction of revolving around the central axis O will be referred to as a circumferential direction, and a direction perpendicular to the central axis and the circumferential direction will be referred to as a radial direction.

The stator 2 has a substantially cylindrical stator core 4. The stator core 4 can be formed by laminating a plurality of electromagnetic steel sheets or by compression-molding a soft magnetic powder. On an inner circumferential surface of the stator core 4, a plurality of teeth 5 protruding toward the central axis O and disposed at regular intervals in the circumferential direction are integrally molded. The teeth 5 are formed to have substantially a rectangular cross section. A plurality of slots 6 and the plurality of teeth 5 are formed at regular intervals in the circumferential direction so that one slot 6 is disposed between adjacent teeth 5. Through these slots 6, armature windings 7 are wound around each of the teeth 5.

The rotor 3 includes the shaft 8 extending along the central axis O and a substantially columnar rotor core 9 externally fitted and fixed to the shaft 8.

The rotor core 9 can be formed by laminating a plurality of electromagnetic steel sheets or by compression-molding a soft magnetic powder. An outer diameter of the rotor core 9 is set such that a predetermined air gap G is formed between each of the teeth 5 and the rotor core 9 facing each other in the radial direction.

Also, a through hole 10 passing through along the central axis O is formed at a radial center of the rotor core 9. The shaft 8 is press-fitted or the like to the through hole 10, and thereby the shaft 8 and the rotor core 9 rotate integrally.

Further, four layers of hollow parts (flux barriers) 11, 12, 13, and 14 (a first hollow part 11, a second hollow part 12, a third hollow part 13, and a fourth hollow part 14) are formed to be aligned in the radial direction in each of the quarter-circumference circumferential angular regions of the rotor core 9. That is, the first hollow part 11 is formed at a position closest to the shaft 8 (on a side furthest inward in the radial direction of the rotor core 9), and the second hollow part 12, the third hollow part 13, and the fourth hollow part 14 are aligned in this order from the first hollow part 11 in a direction away from the shaft 8 (toward a radially outward side). Then, the fourth hollow part 14 is disposed at a position farthest from the shaft 8 (on a side furthest outward in the radial direction).

Also, each of the hollow parts 11 to 14 is formed to follow a flow of magnetic flux formed when the armature windings 7 are energized. That is, each of the hollow parts 11 to 14 is formed to be curved so that a center thereof in the circumferential direction is positioned furthest inward in the radial direction (to have a convex shape toward a radially inward side). Thereby, a direction in which the magnetic flux easily flows and a direction in which the magnetic flux does not easily flow are formed in the rotor core 9.

Here, in the present embodiment, a direction in which the magnetic flux easily flows is referred to as a q-axis. Also, a direction extending in a radial direction that is electrically and magnetically perpendicular to the q axis is referred to as a d-axis. That is, each of the hollow parts 11 to 14 forms a multilayer structure in the radial direction along the d-axis.

More specifically, regarding a q-axis direction in the rotor core 9, a direction in which a flow of the magnetic flux is not interrupted by each of the hollow parts 11 to 14 is referred to as the q-axis. That is, a positive magnetic potential (for example, an N pole of a magnet being brought close thereto) is given to an arbitrary circumferential angular position on an outer circumferential surface 9a of the rotor core 9. Also, a negative magnetic potential (for example, an S pole of a magnet being brought close thereto) is given to another arbitrary circumferential angular position shifted by one pole (a mechanical angle of 90 degrees in the present embodiment) with respect to the positive magnetic potential. Then, when positions of such positive potential and negative potential are shifted in the circumferential direction, a direction from the central axis O toward an arbitrary position when a majority of the magnetic flux flows is defined as the q-axis. Thus, the longitudinal direction of each of the hollow parts 11 to 14 is the q-axis.

On the other hand, a direction in which a flow of the magnetic flux is interrupted by each of the hollow parts 11 to 14, that is, a direction magnetically perpendicular to the q-axis, is referred to as the d-axis. In the present embodiment, a direction parallel to a direction in which two rotor core portions, separated into a region close to the central axis O and a region which is distant from the central axis O by each of the hollow parts 11 to 14, face each other is the d-axis. Also, when the hollow parts 11 to 14 are formed in multiple layers (four layers in the present embodiment), a direction in which the layers overlap is the d-axis. In the present embodiment, the d-axis is not limited to being electrically and magnetically perpendicular to the q-axis and may intersect the q-axis with a certain degree of angular width (for example, a mechanical angle of about 10 degrees) from the perpendicular angle.

As described above, the rotor core 9 is configured to have four poles, and four layers of the hollow parts 11, 12, 13, and 14 are formed for each pole (a quarter-circumference circumferential angular region of the rotor core 9). Thus, one pole is a region between the q-axes.

In the following description, the d-axis is referred to as a pole center C1. That is, each of the hollow parts 11 to 14 is formed to be curved toward the radially inward side so that the pole center C1 is positioned on a radial innermost side. Also, each of the hollow parts 11 to 14 is formed to be curved so that both ends thereof in a longitudinal direction are respectively positioned on outer circumferential portions of the rotor core 9 when viewed from the central axis O direction. Then, each of the hollow parts 11 to 14 is formed to be perpendicular to the pole center C1 at a position thereof closer to a center in the longitudinal direction.

Here, in the rotor core 9, when a width between the first hollow part 11 and the second hollow part 12 on the pole center C1 is W1, and a width between the second hollow part 12 and the third hollow part 13 on the pole center C1 is W2, the widths W1 and W2 are set to satisfy $$W1 \leq W2 \tag{1}$$

Further, when a width between the third hollow part 13 and the fourth hollow part 14 on the pole center C1 is W3, the width W3 is desirable to be such a width that it is slightly smaller than the width W2.

When the rotary electric machine 1 is driven with such a configuration, three-phase alternating current is supplied to the armature windings 7 of the stator 2. Then, a magnetic flux is formed in the predetermined tooth 5. Then, the teeth 5 in which the magnetic flux is formed are sequentially switched in a rotation direction (circumferential direction) of the rotor 3 (the formed magnetic flux moves rotationally). Each of the hollow parts 11 to 14 of the rotor core 9 is formed to follow the flow of the magnetic flux. Therefore, the rotor core 9 rotates following the rotational movement of the magnetic flux so that the magnetic flux flows between each of the hollow parts 11 to 14.

Incidentally, it is known that a magnetic flux density is inversely proportional to the square of a distance at which the magnetic flux is generated. That is, a density of magnetic flux formed due to the teeth 5 becomes smaller as a distance from the teeth 5 becomes further (the closer to the central axis O). On the other hand, when magnetic saturation occurs between each of the hollow parts 11 to 14 of the rotor core 9, the magnetic flux flows to a portion of the rotor core 9 at which magnetic saturation has not occurred (a direction in which the magnetic flux flows easily).

That is, as described above, in order to improve a rotational torque of the shaft 8, it is desirable to distribute the magnetic flux flowing in the rotor core 9 to the shaft 8 side (to a radial center side of the rotor core 9) as far as possible, hut, in practice, the magnetic flux density decreases as the magnetic flux flowing in the rotor core 9 comes closer to the shaft 8. That is, in the rotor core 9, the magnetic flux does not flow as expected between the shaft 8 and the first hollow part 11 and between the first hollow part 11 and the second hollow part 12.

Here, in the first embodiment, the width W2 between the second hollow part 12 and the third hollow part 13 is set to be larger than the width W1 between the first hollow part 11 and the second hollow part 12 on the pole center C1 of the rotor core 9 (see Expression (1)). That is, when the width W2 between the second hollow part 12 and the third hollow part 13 is made larger than the width W1 between the first hollow part 11 and the second hollow part 12 through which the magnetic flux cannot readily pass originally, the magnetic flux between the second hollow part 12 and the third hollow part 13 is made to pass therethrough more easily.

Further, in the rotor core 9, since volumes between the third hollow part 13 and the fourth hollow part 14 and on the outer circumferential surface 9a side of the fourth hollow part 14 are small (a path for the magnetic flux is narrow) because the rotor core 9 has a columnar shape, magnetic saturation tends to occur. Therefore, a majority of the magnetic flux can be caused to flow between the second hollow part 12 and the third hollow part 13.

Therefore, according to the first embodiment described above, in the rotor core 9, the magnetic flux can be caused to uniformly flow in a region in which magnetic flux actually having a large influence on improvement of the rotational torque of the shaft 8 (a region away from the shaft 8 with respect to the second hollow part 12) is distributed. That is, the magnetic flux can be caused to efficiently flow through the rotor core 9. Therefore, the rotational torque of the shaft 8 can be efficiently improved.

Second Embodiment

Next, a second embodiment will be described with reference to FIG. 2 while referencing FIG. 1.

Figure 2:
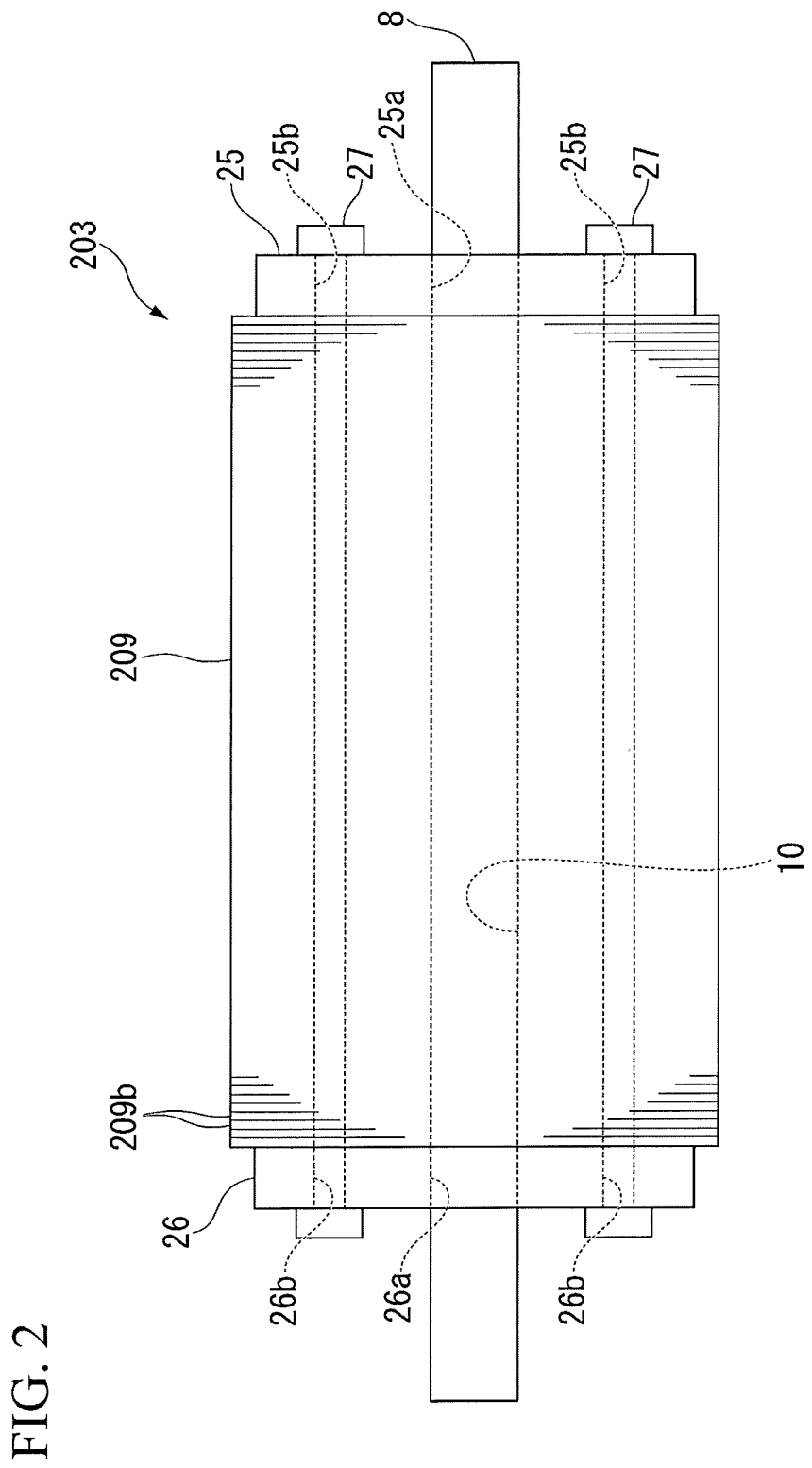
FIG. 2 is a side view showing a rotor of a second embodiment.

FIG. 2 is a side view of a rotor 203 of the second embodiment from a radial direction of a shaft 8. Aspects the same as in the above-described first embodiment are assigned the same reference signs and description thereof will be omitted (this is the same in subsequent embodiments).

As shown in FIG. 2, a rotor core 209 constituting the rotor 203 of the second embodiment is formed by laminating a plurality of electromagnetic steel sheets 209b. In the rotor core 209 with the configuration described above, the plurality of electromagnetic steel sheets 209b are sandwiched by a pair of rotor core pressers 25 and 26 disposed on both sides in a central axis O direction. This point is different from the first embodiment described above.

The rotor core pressers 25 and 26 are formed in substantially a disc shape using a nonmagnetic material. Through holes 25a and 26a that allow the shaft 8 to be press-fitted are formed at a radial center of the rotor core pressers 25 and 26. Thereby, the rotor core pressers 25 and 26 are fixed to the shaft 8, and movement of the rotor core 209 with respect to the shaft 8 in the central axis O direction is restricted.

Also, bolt insertion holes 25b and 26b through which a stud bolt 27 can be inserted are formed in the rotor core pressers 25 and 26 at a position corresponding to any one of a second hollow part 12 and a third hollow part 13 (any of which is seen in FIG. 1) of the rotor core 209.

The stud bolt 27 is for maintaining a sandwiched state of the plurality of electromagnetic steel sheets 209b using the pair of rotor core pressers 25 and 26. The stud bolt 27 is inserted through any one of the second hollow part 12 and the third hollow part 13 via the bolt insertion hole 25b of one rotor core presser 25 of the pair of rotor core pressers 25 and 26.

Also, a distal end of the stud bolt 27 protrudes toward the outside in the central axis O direction via the bolt insertion hole 26b of the other rotor core presser 26. The distal end is fastened and fixed by a nut or buckled and deformed. Thereby, the plurality of electromagnetic steel sheets 209b are firmly integrated due to the pair of rotor core pressers 25 and 26.

Here, the rotor core 209 is set such that a width W1 between a first hollow part 11 and the second hollow part 12 and a width W2 between the second hollow part 12 and the third hollow part 13 satisfy Expression (1) above. In other words, a width of the second hollow part 12 or the third hollow part 13 on a pole center C1 is formed to be slightly small in order to satisfy Expression (1) above. The stud bolt 27 is inserted through any one of the second hollow part 12 and the third hollow part 13 formed to have this small width.

A shaft diameter of the stud bolt 27 is set substantially equal to the width of the second hollow part 12 or the third hollow part 13 formed to be small in width on the pole center C1. That is, the stud bolt 27 serves not only the role of fixing the rotor core 209 via the pair of rotor core pressers 25 and 26 but also the role of restricting displacement in a direction along the pole center C1 of the rotor core 209 positioned on both sides of the hollow part (the second hollow part 12 or the third hollow part 13) through which the stud bolt 27 is inserted.

When the rotor 203 is rotated at a high speed with such a configuration, a centrifugal force and a centripetal force act on the rotor core 209, and the rotor core 209 tries to deform toward the radially inward and radially outward sides. Since the plurality of hollow parts 11 to 14 are formed in the rotor core 209, the rotor core 209 is likely to be deformed. However, since the stud bolt 27 is inserted through the predetermined hollow part (the second hollow part 12 or the third hollow part 13), displacement of the rotor core 209 toward the sides radially inward and radially outward is restricted by the stud bolt 27.

Therefore, according to the second embodiment described above, it is possible to achieve suppression of deformation of the rotor core 209 when the rotor 203 is rotated at a high speed in addition to the same effects as those of the first embodiment described above. Therefore, torque characteristics can be stabilized and vibration and noise during driving can be decreased.

Third Embodiment

Next, a third embodiment will be described with reference to FIG. 3.

Figure 3:
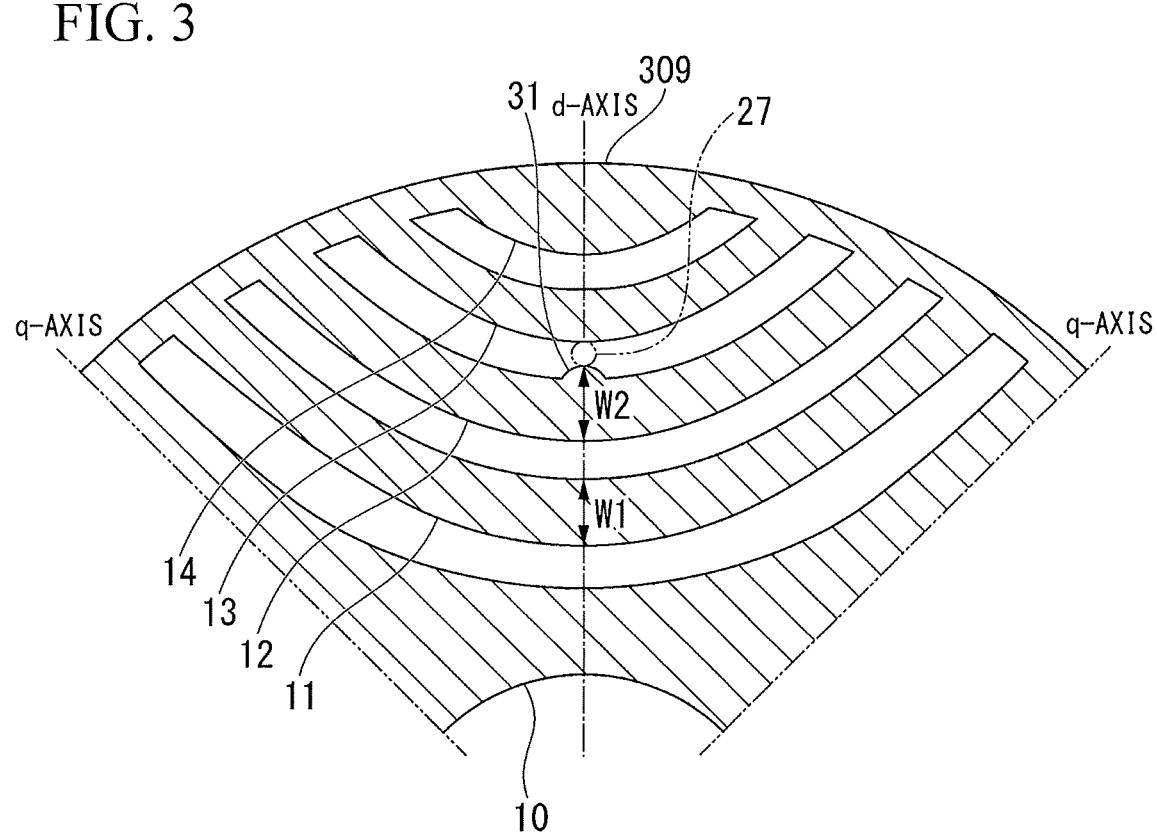
FIG. 3 is a cross-sectional view showing a configuration of a portion of a rotor core of a third embodiment.

FIG. 3 is a cross-sectional view perpendicular to a shaft 8 showing a configuration of a portion of a rotor core 309 of the third embodiment.

As shown in FIG. 3, a ridge part 31 protruding to face a third hollow part 13 is integrally formed in the rotor core 309 of the third embodiment between a second hollow part 12 and the third hollow part 13 on a pole center C1. This point is different from the first embodiment described above.

Due to the ridge part 31 formed to protrude toward the third hollow part 13, a width W1 between a first hollow part 11 and the second hollow part 12 and a width W2 between the second hollow part 12 and the third hollow part 13 satisfy Expression (1) above.

The ridge part 31 is formed over the entire rotor core 309 in a central axis O direction. The ridge part 31 has a semicircular cross-sectional shape in a direction perpendicular to the central axis O.

With such a configuration, for example, when a pair of rotor core pressers 25 and 26 and a stud bolt 27 are used (the stud bolt 27 is shown by a double-dotted-dashed line in FIG. 3) to fix the rotor core 309 to the shaft 8 as in the second embodiment described above, the stud bolt 27 is inserted through a position corresponding to the ridge part 31 of the third hollow part 13. A shaft diameter of the stud bolt 27 is set to such a diameter that the stud bolt 27 is disposed on the ridge part 31 of the third hollow part 13 with almost no clearance.

Therefore, according to the third embodiment described above, the same effects as those of the second embodiment described above can be achieved.

Further, in the third embodiment described above, a case in which the ridge part 31 having a semicircular cross-sectional shape is formed to protrude toward the third hollow part 13 on the pole center C1 between the second hollow part 12 and the third hollow part 13 of the rotor core 309 is described. However, it is not limited thereto, and the ridge part 31 may be configured as follows.

First Modified Example of Third Embodiment

Figure 4:
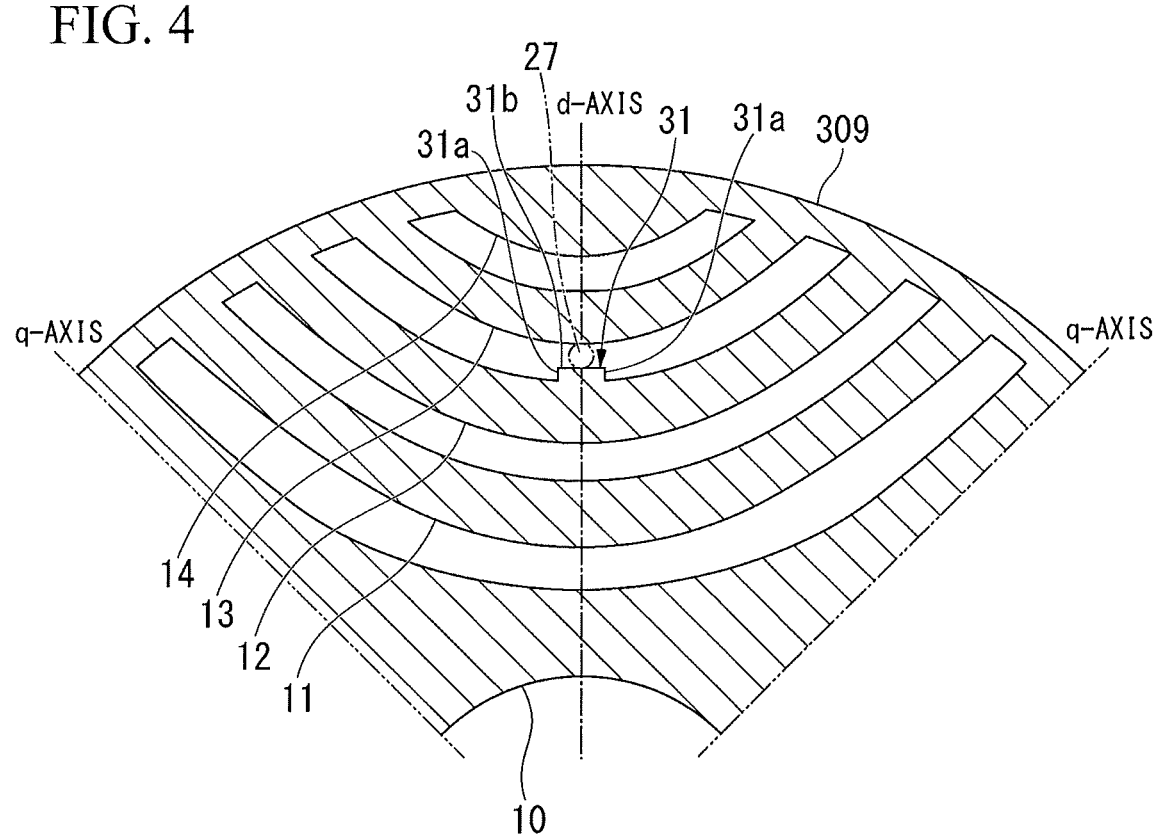
FIG. 4 is a cross-sectional view showing a configuration of a portion of a rotor core of a first modified example in the third embodiment.

FIG. 4 is a cross-sectional view perpendicular to the shaft 8 showing a configuration of a portion of the rotor core 309 in a first modified example of the third embodiment and corresponds to FIG. 3 described above.

That is, as shown in FIG. 4, a cross-sectional shape of the ridge part 31 in a direction perpendicular to the central axis O may be rectangular. When the ridge part 31 is formed in a rectangular shape in cross section, the ridge part 31 includes three flat surfaces (side surfaces 31a and a distal end surface 31b) of two side surfaces 31a formed on both sides in a longitudinal direction of the third hollow part 13 and the distal end surface 31b straddling these two side surfaces 31a.

Therefore, for example, when the rotor core 309 is formed by laminating a plurality of electromagnetic steel sheets, circumferential and radial positioning of each of the electromagnetic steel sheets can be performed using the side surfaces 31a and the distal end surface 31b. The side surfaces 31a and the distal end surface 31b are formed to be flat and thus are suitable for positioning of each of the electromagnetic steel sheets.

Therefore, according to the first modified example of the third embodiment described above, a process of forming the rotor core 309 can be facilitated and simplified in addition to the same effects as those of the third embodiment described above.

Second Modified Example of Third Embodiment

Figure 5:
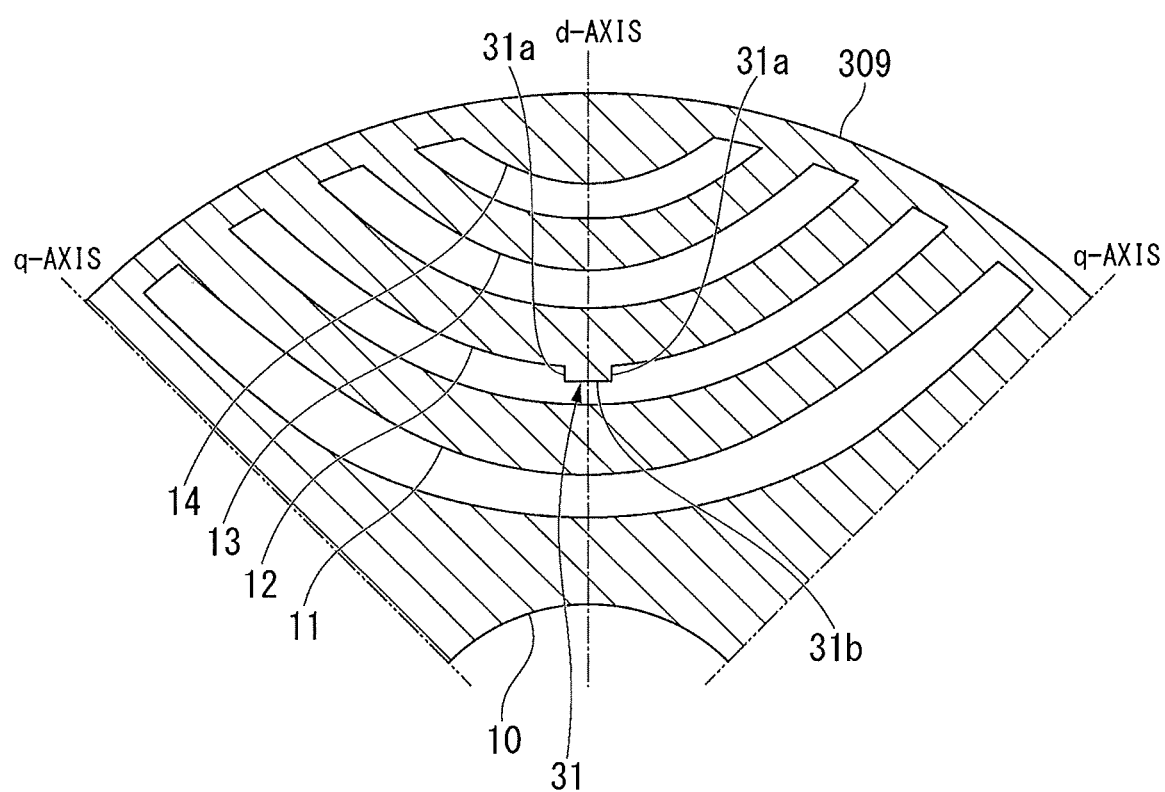
FIG. 5 is a cross-sectional view showing a configuration of a portion of a rotor core of a second modified example in the third embodiment.

FIG. 5 is a cross-sectional view perpendicular to the shaft 8 showing a configuration of a portion of the rotor core 309 in a second modified example of the third embodiment and corresponds to FIG. 3 described above.

Also, as shown in FIG. 5, the ridge part 31 may be formed to protrude toward the second hollow part 12 on the pole center C1 between the second hollow part 12 and the third hollow part 13 of the rotor core 309. In this case, the same effects as those of the first modified example described above can be achieved by making the ridge part 31 have a rectangular cross section.

Third Modified Example of Third Embodiment

Figure 6:
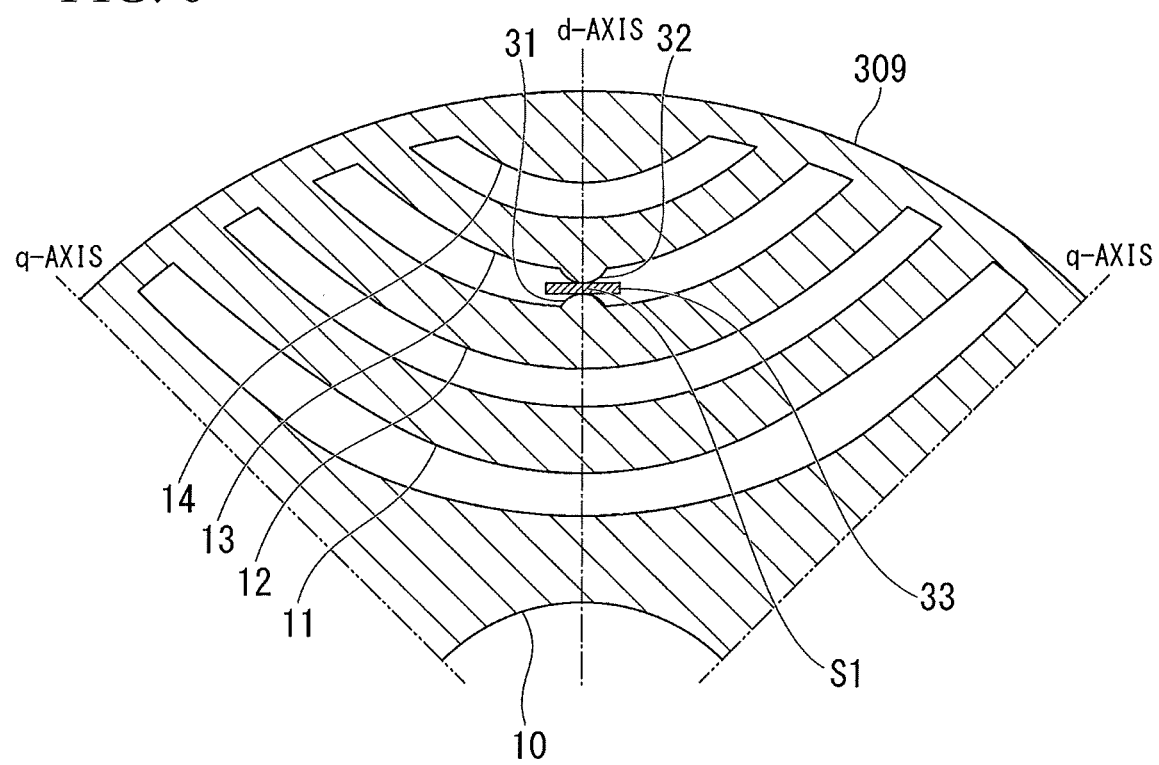
FIG. 6 is a cross-sectional view showing a configuration of a portion of a rotor core of a third modified example in the third embodiment.

FIG. 6 is a cross-sectional view perpendicular to the shaft 8 showing a configuration of a portion of the rotor core 309 in a third modified example of the third embodiment and corresponds to FIG. 3 described above.

Also as shown in FIG. 6, a second ridge part 32 may be formed to protrude toward the third hollow part 13 on the pole center C1 between the third hollow part 13 and a fourth hollow part 14 of the rotor core 309 in addition to the ridge part 31 formed to protrude toward the third hollow part 13 on the pole center C1 between the second hollow part 12 and the third hollow part 13 of the rotor core 309.

Shapes of the ridge part 31 and the second ridge part 32 are semicircular in cross section. However, it is not limited thereto and may have a rectangular cross section. Also, any one of the ridge part 31 and the second ridge part 32 may have a semicircular cross section and the other thereof may have a rectangular cross section.

The ridge part 31 and the second ridge part 32 are disposed to face each other on the pole center C1. The ridge part 31 and the second ridge part 32 are not in contact with each other and a slight gap S1 is formed between the ridge part 31 and the second ridge part 32. A reinforcing plate 33 is interposed in the gap S1.

The reinforcing plate 33 is a plate-shaped member extending in the central axis O direction and is sandwiched between the ridge part 31 and the second ridge part 32. Therefore, according to the third modified example of the third embodiment, deformation of the rotor core 309 during high-speed rotation can be suppressed due to the reinforcing plate 33.

Fourth Embodiment

Next, a fourth embodiment will be described with reference to FIGS. 7 and 8.

Figure 7:
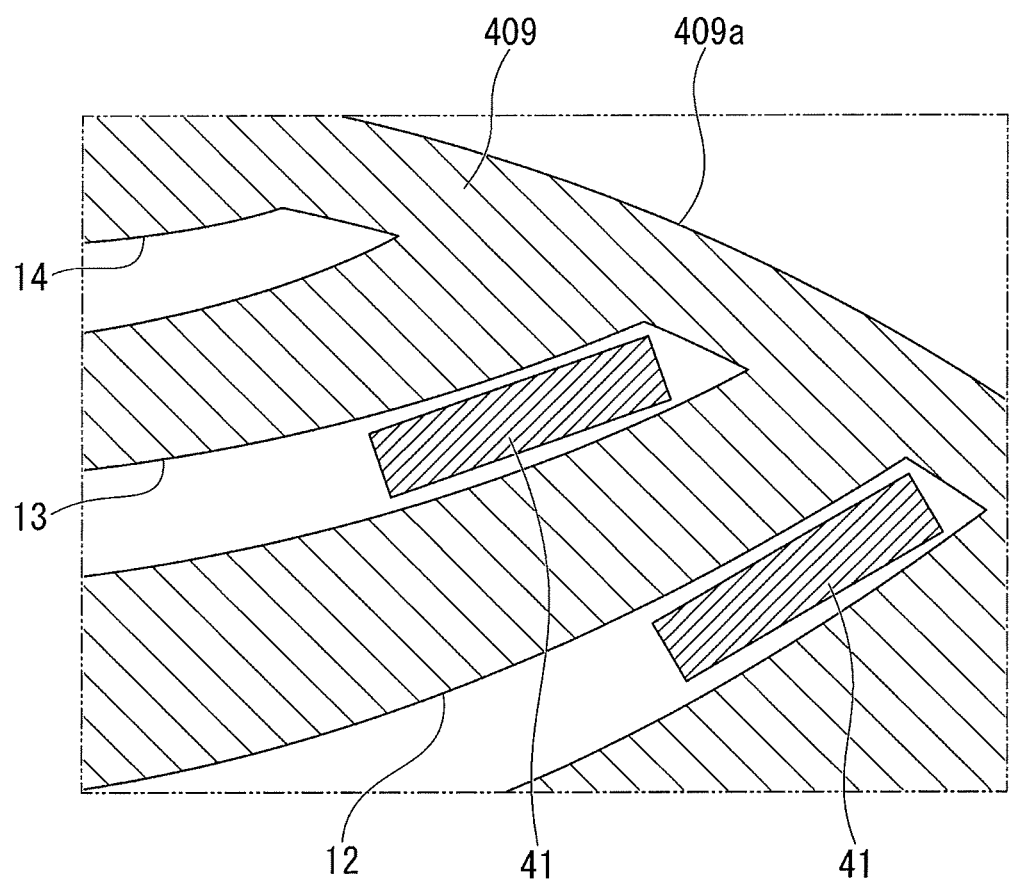
FIG. 7 is a cross-sectional view showing a configuration of a portion of a rotor core of a fourth embodiment.

FIG. 7 is a cross-sectional view perpendicular to a shaft 8 showing a configuration of a portion of a rotor core 409 in the fourth embodiment. FIG. 8 is a side view of a rotor 403 of the fourth embodiment from a radial direction of the shaft 8.

Figure 8:
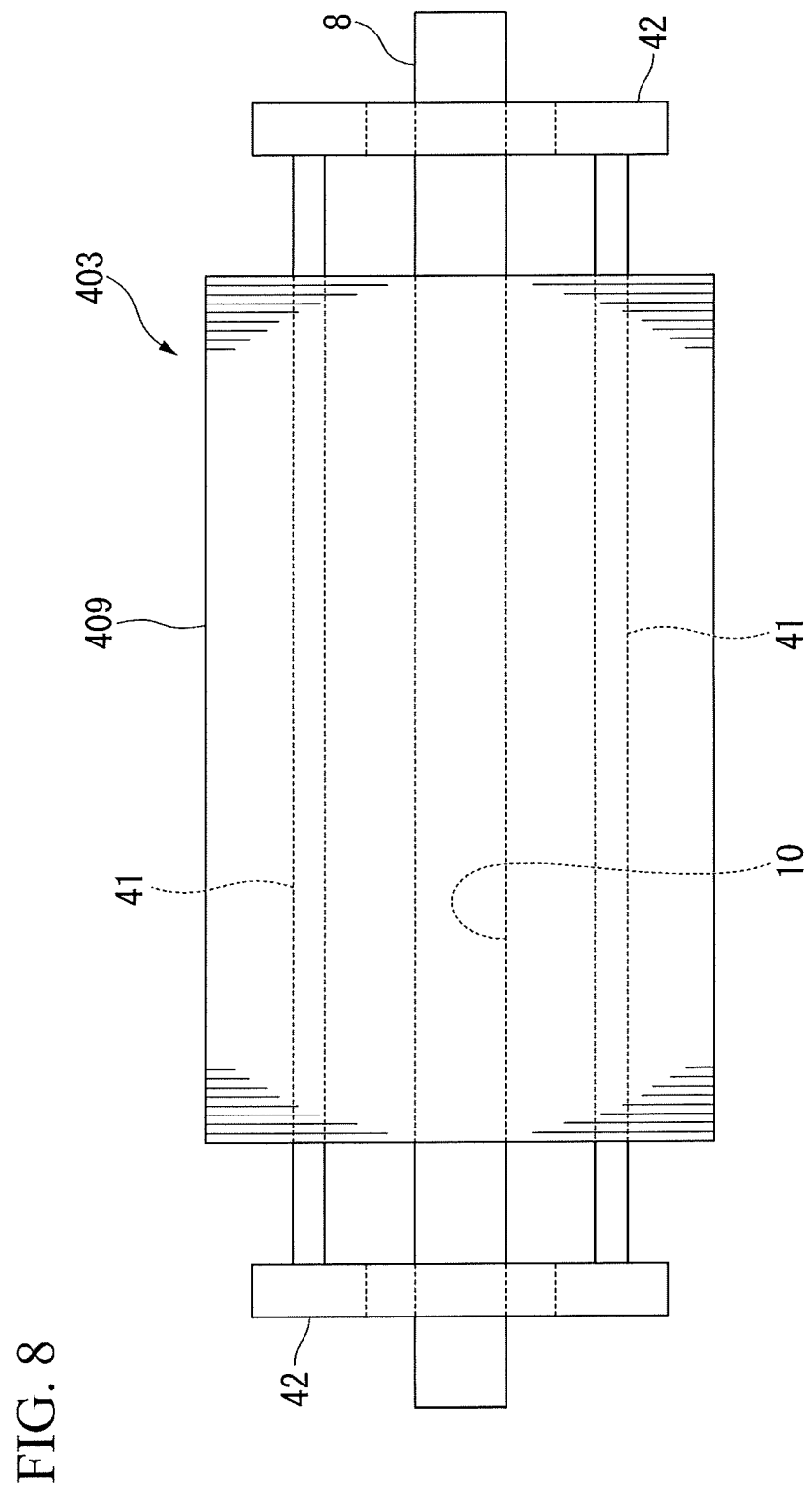
FIG. 8 is a side view showing a rotor of the fourth embodiment.

As shown in FIGS. 7 and 8, in the rotor core 409 of the fourth embodiment, conductor bars 41 are respectively inserted into arbitrary hollow parts 11 to 14 (for example, a second hollow part 12 and a third hollow part 13) on both sides in a longitudinal direction (close to an outer circumferential surface 409a of the rotor core 409). This point is different from the first embodiment described above.

Each of the conductor bars 41 has a substantially rectangular cross-sectional shape perpendicular to a central axis O direction, and is an elongated plate-like member. Also, the conductor bar 41 is formed of a nonmagnetic material having conductivity such as, for example, an aluminum alloy or a copper alloy. Further, both ends in the central axis O direction of each of the conductor bars 41 are formed to protrude from the rotor core 409. The both ends in the central axis O direction of the conductor bar 41 are short-circuited by a short-circuit ring 42.

The short-circuit ring 42 is formed of a nonmagnetic material having conductivity in substantially an annular shape. Specifically, a material of the short-circuit ring 42 is preferably the same material as that of the conductor bar 41 such as, for example, an aluminum alloy or a copper alloy. However, it is not limited thereto. When the rotor 403 is rotationally driven with such a configuration, a three-phase alternating current is supplied to armature windings 7 of a stator 2 (see FIG. 1), and then a magnetic flux is formed in predetermined teeth 5.

At this time, in an asynchronous state until the rotor 403 in a stopped state rotates in synchronization with rotational movement of the magnetic flux on the stator 2 side, an induced current is generated in the conductor bar 41 provided in the rotor core 409. That is, the conductor bar 41 functions as a secondary coil and generates a starting torque for rotating the rotor 403 between the conductor bar 41 and the stator 2.

Incidentally, at the time of starting a rotary electric machine 1, it is necessary to detect a relative position between the stator 2 and the rotor 403 and to supply electric power to the predetermined armature windings 7 on the basis of the relative position. For this reason, in the first to third embodiments described above, an inverter is required to start the rotary electric machine 1, which may increase the costs of the rotary electric machine 1.

In contrast, in the fourth embodiment, since the conductor bar 41 functions as a secondary coil and generates a starting torque for rotating the rotor 403 between the conductor bar 41 and the stator 2, an inverter is unnecessary. Therefore, according to the fourth embodiment described above, it is possible to achieve reduction in the costs of the rotary electric machine 1 due to an inverter for starting the rotary electric machine 1 being unnecessary in addition to the same effects as those of the first embodiment described above.

Modified Example of Fourth Embodiment

Figure 9:
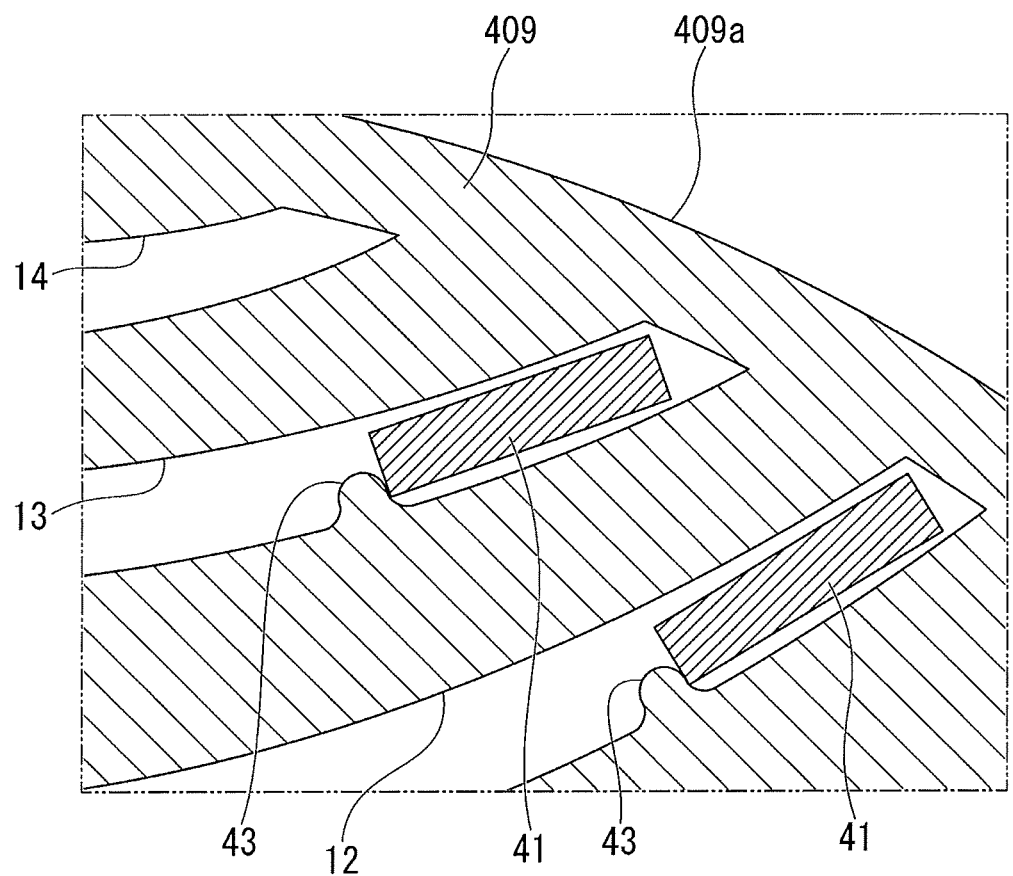
FIG. 9 is a cross-sectional view showing a configuration of a portion of a rotor core of a modified example of the fourth embodiment.

FIG. 9 is a cross-sectional view perpendicular to the shaft 8 showing a configuration of a portion of the rotor core 409 in a modified example of the fourth embodiment and corresponds to FIG. 7 described above.

As shown in FIG. 9, an auxiliary ridge part 43 may be formed in the rotor core 409 to protrude toward each of the hollow parts 11 to 14 at which the conductor bar 41 is disposed. The auxiliary ridge part 43 is formed throughout in the central axis O direction. Also, the auxiliary ridge part 43 is disposed adjacent to the conductor bar 41. Due to the auxiliary ridge part 43, positioning of the conductor bar 41 is performed, and positional displacement of the conductor bar 41 is restricted.

Therefore, according to the modified example of the fourth embodiment described above, positioning of the conductor bar 41 can be easily performed and positional displacement of the conductor bar 41 can be prevented in addition to the same effects as those of the fourth embodiment described above. Therefore, the function of the conductor bar 41 can be stabilized and fixing of the conductor bar 41 can be easily performed.

Further, in the modified example of the fourth embodiment described above, a case in which the auxiliary ridge part 43 is formed throughout in the central axis O direction has been described. However, it is not limited thereto, and a plurality of auxiliary ridge parts 43 may be disposed at a predetermined interval in the central axis O direction. Even with such a configuration, positioning of the conductor bar 41 can be easily performed and positional displacement of the conductor bar 41 can be prevented by the auxiliary ridge parts 43.

Also, in the rotor core 409 of the fourth embodiment and the modified example of the fourth embodiment described above, a case in which the conductor bars 41 are respectively inserted into arbitrary hollow parts 11 to 14 (for example, the second hollow part 12 and the third hollow part 13) on both sides in the longitudinal direction (close to the outer circumferential surface 409a of the rotor core 409) has been described. However, it is not limited thereto, and the conductor bar 41 need only be inserted into at least one of the hollow parts. Also, the conductor bar 41 need only be disposed close to the outer circumferential surface 409a of the rotor core 409 in the hollow part. With such a configuration, a starting torque for rotating the rotor 403 can be generated.

Further, in the above-described embodiments, a case in which each of the rotor cores 9 to 409 has four layers of the hollow parts 11 to 14 formed in each quarter-circumference circumferential angular region (for each pole) has been described. However, it is not limited thereto, and a plurality of hollow parts of four or more layers may be formed. Also when four or more layers of hollow parts are formed, in the first hollow part 11 formed at a position closest to the shaft 8 (on a side furthest inward in the radial direction of the rotor cores 9 to 409), the second hollow part 12 positioned next to the first hollow part 11, and the third hollow part 13 positioned on a side opposite to the first hollow part 11 with respect to the second hollow part 12, the width W1 between the first hollow part 11 and the second hollow part 12 on the pole center C1 and the width W2 between the second hollow part 12 and the third hollow part 13 on the pole center C1 need only be set to satisfy Expression (1) above.

Also, when four or more layers of hollow parts are formed in the rotor cores 9 to 409, it is preferable that a width Wn1 between the fourth hollow part 14 and other hollow parts disposed in a direction away from the shaft 8 with respect to the fourth hollow part 14 and a width Wn2 between other hollow parts all be set to be the same width. Further, the widths Wn1 and Wn2 are desirable to be almost equal to the width W3 (see FIG. 1) between the third hollow part 13 and the fourth hollow part 14 on the pole center C1, or such widths that they are slightly smaller than the width W3.

With such a configuration, concentration of magnetic flux on an outer circumferential side of the rotor cores 9 to 409 can be suppressed. Therefore, in the rotor cores 9 to 409, the magnetic flux can be caused to uniformly flow in a region in which magnetic flux actually having a large influence on improvement of the rotational torque of the shaft 8 (a region away from the shaft 8 with respect to the second hollow part 12) is distributed as much as possible.

Further, in the above-described embodiments, a case in which each of the hollow parts 11 to 14 is formed to be curved so that a center thereof in the circumferential direction is positioned furthest inward in the radial direction (to have a convex shape toward the radially inward side) has been described. However, it is not limited thereto, and each of the hollow parts 11 to 14 need only be formed in a convex shape toward the radially inward side. That is, each of the hollow parts 11 to 14 may not be formed to be curved.

Also, in the above-described embodiments, a case in which the rotor cores 9 to 409 are configured to have four poles has been described. However, it is not limited thereto, and the rotor cores 9 to 409 may be configured to have four or more poles.

According to at least any one of the embodiments described above, in the rotor cores 9 to 409, the magnetic flux can be caused to uniformly flow in a region in which magnetic flux actually having a large influence on improvement of the rotational torque of the shaft 8 (a region away from the shaft 8 with respect to the second hollow part 12)

is distributed. That is, the magnetic flux can be caused to efficiently flow through the rotor cores 9 to 409. Therefore, the rotational torque of the shaft 8 can be efficiently improved.

Also, for example, when a pair of rotor core pressers 25 and 26 and the stud bolt 27 are used to fix the rotor cores 9 to 409 to the shaft 8, deformation when the rotor cores 9 to 409 are rotated at a high speed can be suppressed by using the stud bolt 27. Therefore, torque characteristics can be stabilized and vibration and noise during driving can be suppressed.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A synchronous reluctance type rotary electric machine, comprising:
   a shaft rotating around a rotation axis; and
   a rotor core fixed to the shaft and including multi-layered hollow parts having a convex shape toward a radially inward side formed for each pole in cross section, wherein
   when a center in a circumferential direction of one pole is a pole center, a hollow part closest to the shaft among the plurality of hollow parts is a first hollow part, a hollow part positioned next to the first hollow part is a second hollow part, and a hollow part positioned on a side opposite to the first hollow part with respect to the second hollow part is a third hollow part,
   a first ridge part formed on the pole center to face any one of the second hollow part and the third hollow part and extending along the rotation axis is formed in the rotor core positioned between the second hollow part and the third hollow part, and
   a width W1 between the first hollow part and the second hollow part on the pole center and a width W2 between the second hollow part and the third hollow part on the pole center are set to satisfy W1<W2.

2. The synchronous reluctance type rotary electric machine according to claim 1, wherein, when a plurality of hollow parts positioned in a direction away from the shaft with respect to the third hollow part are other hollow parts, a width Wn between other hollow parts all are set to be the same width.

3. The synchronous reluctance type rotary electric machine according to claim 1, wherein the first ridge part has at least any one of a rectangular and semicircular cross-sectional shape in a direction perpendicular to the rotation axis.

4. The synchronous reluctance type rotary electric machine according to claim 1, wherein,
   when the plurality of hollow parts positioned in a direction away from the shaft with respect to the third hollow part are other hollow parts,
   the first ridge part is formed to face the third hollow part in the rotor core positioned between the second hollow part and the third hollow part, and
   a second ridge part formed on the pole center to face the third hollow part and extending along the rotation axis is formed in the rotor core positioned between the third hollow part and other hollow parts.

5. The synchronous reluctance type rotary electric machine according to claim 4, wherein the second ridge part has at least any one of a rectangular and semicircular cross-sectional shape in a direction perpendicular to the rotation axis.

6. The synchronous reluctance type rotary electric machine according to claim 1, wherein
   a conductor which is nonmagnetic and has conductivity is provided throughout at least one of the plurality of hollow parts in a rotation axis direction, and
   the conductor is disposed close to an outer circumferential surface of the rotor core in the hollow part.

7. The synchronous reluctance type rotary electric machine according to claim 6, wherein
   an auxiliary ridge part, which is directed toward the hollow part at which the conductor is disposed and extending along the rotation axis, is formed in the rotor core, and
   the auxiliary ridge part is formed parallel to the conductor.

8. A synchronous reluctance type rotary electric machine, comprising:
   a shaft rotating around a rotation axis; and
   a rotor core fixed to the shaft and including multi-layered hollow parts having a convex shape toward a radially inward side formed for each pole in cross section, wherein
   when a center in a circumferential direction of one pole is a pole center, a hollow part closest to the shaft among the plurality of hollow parts is a first hollow part, a hollow part positioned next to the first hollow part is a second hollow part, and a hollow part positioned on a side opposite to the first hollow part with respect to the second hollow part is a third hollow part,
   a first ridge part formed on the pole center to face any one of the second hollow part and the third hollow part and extending along the rotation axis is formed in the rotor core positioned between the second hollow part and the third hollow part,
   a width W1 between the first hollow part and the second hollow part on the pole center and a width W2 between the second hollow part and the third hollow part on the pole center are set to satisfy W1≤W2,
   when the plurality of hollow parts positioned in a direction away from the shaft with respect to the third hollow part are other hollow parts,
   the first ridge part is formed to face the third hollow part in the rotor core positioned between the second hollow part and the third hollow part, and
   a second ridge part formed on the pole center to face the third hollow part and extending along the rotation axis is formed in the rotor core positioned between the third hollow part and other hollow parts.

* * * * *